United States Patent
Sharpless

[19]
[11] Patent Number: 5,849,198
[45] Date of Patent: Dec. 15, 1998

[54] GRATE SUSPENDED STORM DRAIN FILTER WITH OIL ABSORBING MEDIA

[76] Inventor: Robert Sharpless, 333 Beaumont Rd., Devon, Pa. 19333

[21] Appl. No.: 906,787

[22] Filed: Aug. 9, 1997

[51] Int. Cl.⁶ .................... E03F 1/00; E03F 5/14; C02F 1/28
[52] U.S. Cl. .................... 210/693; 210/799; 210/163; 210/164; 210/247; 404/4
[58] Field of Search .................... 210/690, 691, 210/692, 693, 163, 164, 232, 247, 305, 456, 799; 404/2, 3, 4, 5

[56] References Cited

U.S. PATENT DOCUMENTS

| | | |
|---|---|---|
| 232,948 | 10/1880 | Dernham . |
| 809,201 | 1/1906 | Lutz . |
| 2,615,526 | 10/1952 | Lane . |
| 4,655,913 | 4/1987 | Boersma . |
| 5,223,154 | 6/1993 | MacPherson ............................ 210/790 |
| 5,232,587 | 8/1993 | Hegemier et al. ...................... 210/163 |
| 5,284,580 | 2/1994 | Shyh ....................................... 210/163 |
| 5,372,714 | 12/1994 | Loque ..................................... 210/164 |
| 5,397,464 | 3/1995 | Hannon ................................... 210/163 |
| 5,403,474 | 4/1995 | Emery ..................................... 210/163 |
| 5,405,539 | 4/1995 | Schneider ............................... 210/163 |
| 5,480,254 | 1/1996 | Autry ......................................... 404/2 |
| 5,643,445 | 7/1997 | Billias et al. ........................... 210/163 |
| 5,744,048 | 4/1998 | Stetler ..................................... 210/164 |
| 5,788,849 | 8/1998 | Hutter, Jr. et al. ...................... 210/163 |

Primary Examiner—Robert Popovics
Attorney, Agent, or Firm—LaMorte & Associates

[57] ABSTRACT

A device and method for removing petroleum based contaminants from the runoff water that passes into a storm drain. The device is a filter apparatus that can be added to a storm drain or a storm drain assembly containing a filter apparatus. The filter apparatus consists of a filter cartridge containing oil absorbing material. The filter cartridge is suspended below the grate of the storm drain by flexible suspension elements such as chains. The top of each of the flexible suspension elements terminate at an attachment element that engages the grate of the storm grate. As a result, the filter cartridge is suspended directly from the grate so as to not disturbed and the position of the grate.

16 Claims, 3 Drawing Sheets

GRATE SUSPENDED STORM DRAIN FILTER WITH OIL ABSORBING MEDIA

BACKGROUND OF THE INVENTION

1. Field of the Invention

In general, the present invention relates to filter devices that are contained within the confines of a storm drain. More particularly, the present invention relates to the structure of such filters and the support devices used to position such filters within the storm drain.

2. Description of the Prior Art

In civil engineering design, many modern streets are designed and built with storm drains. The storm drains are periodically located along the curb of the street. The street is graded in such a manner so that any water falling onto the street will flow to one of the storm drains. This prevents water from collecting on the street and inhibiting the flow of traffic along the street.

Traditionally, curb side storm drains contain a catch basin that is connect to a below lying sewer with a large diameter pipe. The catch basin is commonly covered with a grate. The grate enables water to flow into the catch basin but prevents large objects, such as tree branches, from passing into the catch basin and blocking the sewer pipe. The catch basin itself collects debris that is heavier than water but is washed into the storm sewer by the force of flowing water. As a result, storm drains need periodic maintenance, wherein the debris collected in the catch basin is removed.

As water flows over a street to a storm sewer, the water often mixes with oil and other contaminants. The oil comes from automobiles that leak oil. Other petroleum based contaminants include grease, diesel fuel, hydraulic fluid and gasoline. The federal and state environmental protection laws set forth many guidelines governing the disposal of petroleum based contaminants. Generally, it is unlawful to dispose of petroleum based contaminants in the public sewer system or in any other flowing supply of water. As such, the rain runoff that passes into many curb side storm drains fails to meet the state and federal standards due to the petroleum based contaminants that wash into the storm drains with the rain water.

The prior art contains many different types of filter systems that are intended to at least partially purify the runoff water that passes into a storm drain. Certain prior art devices are filters that pass over the grate above the storm sewer. Such a filter is exemplified by U.S. Pat. No. 5,403,474 to Emery, entitled CURB INLET GRAVEL SEDIMENT FILTER. In such prior art arrangements, the filters itself is accessible above the sewer's grate. Consequently, the filter disrupts the smoothness of a street's surface and therefore is only good in certain temporary applications.

Since the catch basins of many storm drains are made of poured cement, it is not practical to change the structure of existing storm drains in order for those storm drains to accept filters. As a result, many filter configurations have been made that are adapted to be added to existing storm sewer designs. In a typical storm sewer, a ledge is formed around the to rim of the catch basin. The drain grate rests upon the ledge, thereby covering the open top of the catch basin. The depth of the ledge typically corresponds to the thickness of the grate. As a result, the top of the grate will lay in the same plane as does the surface of the street. In the prior art, the are filter structures that hang in the storm drain catch basin below the grate. Typically, such prior art filter structures engage the same ridge of the catch basin that supports the grate. As a result, a portion of the filter structure must be place in between the grate and the ridge upon which the grate was designed to sit. Such prior art filter structures are exemplified by U.S. Pat. No. 5,223,154 to MacPherson, entitled SYSTEM FOR FILTERING LIQUIDS IN A CATCH BASIN USING FILTERS IN SERIES AND OVERFLOW CHANNELS; U.S. Pat. No. 5,372,714 to Logue, entitled STORM SEWER CATCH BASIN AND FILTER and U.S. Pat. No. 5,284,580 to Shyh, entitled REFUSE COLLECTING FRAME FOR SEWER. One of the problems associated with such prior art filter structures is that the presence of the filter structure under the grate prevents the grate from seating properly onto the ridge at the top of the catch basin. As a result, the grate is held above its normal height, which may cause the grate to protrude above street level. If the grate does extend above street level, the grate becomes a tripping hazard. Furthermore, the grate can be caught by street plows and car tires, wherein the grate can be damaged or accidentally moved out of place.

A need therefore exists for a filter structure that can be retroactively attached to a storm drain in a manner where the filter element does not extend above street level or cause the grate of the storm drain to extend above street level. A need also exists for a replaceable filter cartridge that can be used in a storm drain, wherein the filter cartridge removes petroleum based contaminants from the water runoff passing through the storm drain. These needs are provided for by the present invention as set forth in the below description and claims.

SUMMARY OF THE INVENTION

The present invention is a device and method for removing petroleum based contaminants from the runoff water that passes into a storm drain. The device is a filter apparatus that can be added to a storm drain or a storm drain assembly containing a filter apparatus. The filter apparatus consists of a filter cartridge containing oil absorbing material. The filter cartridge is suspended below the grate of the storm drain by suspension elements such as chains or rods. The top of each of the suspension elements terminate at an attachment element that engages the grate of the storm grate. As a result, the filter cartridge is suspended directly from the grate. By suspending the filter cartridge from directly from the grate of a storm drain, the filter cartridge can easily be positioned directly below the grate so that all water falling through the grate passes through the filter cartridge. Furthermore, by suspending the filter cartridge from the grate, the designed orientation of the grate is not disturbed and the grate remains at or below street level.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention filter apparatus can be used in many different types of storm drains, the filter apparatus is particularly well suited for use in curb side storm drains that are commonly designed into the sides of paved streets. As a result, by way of an example, the present invention filter apparatus will be described in conjunction with a typical curb side storm drain in order to set forth the best mode contemplated for the present invention.

Figure 1:
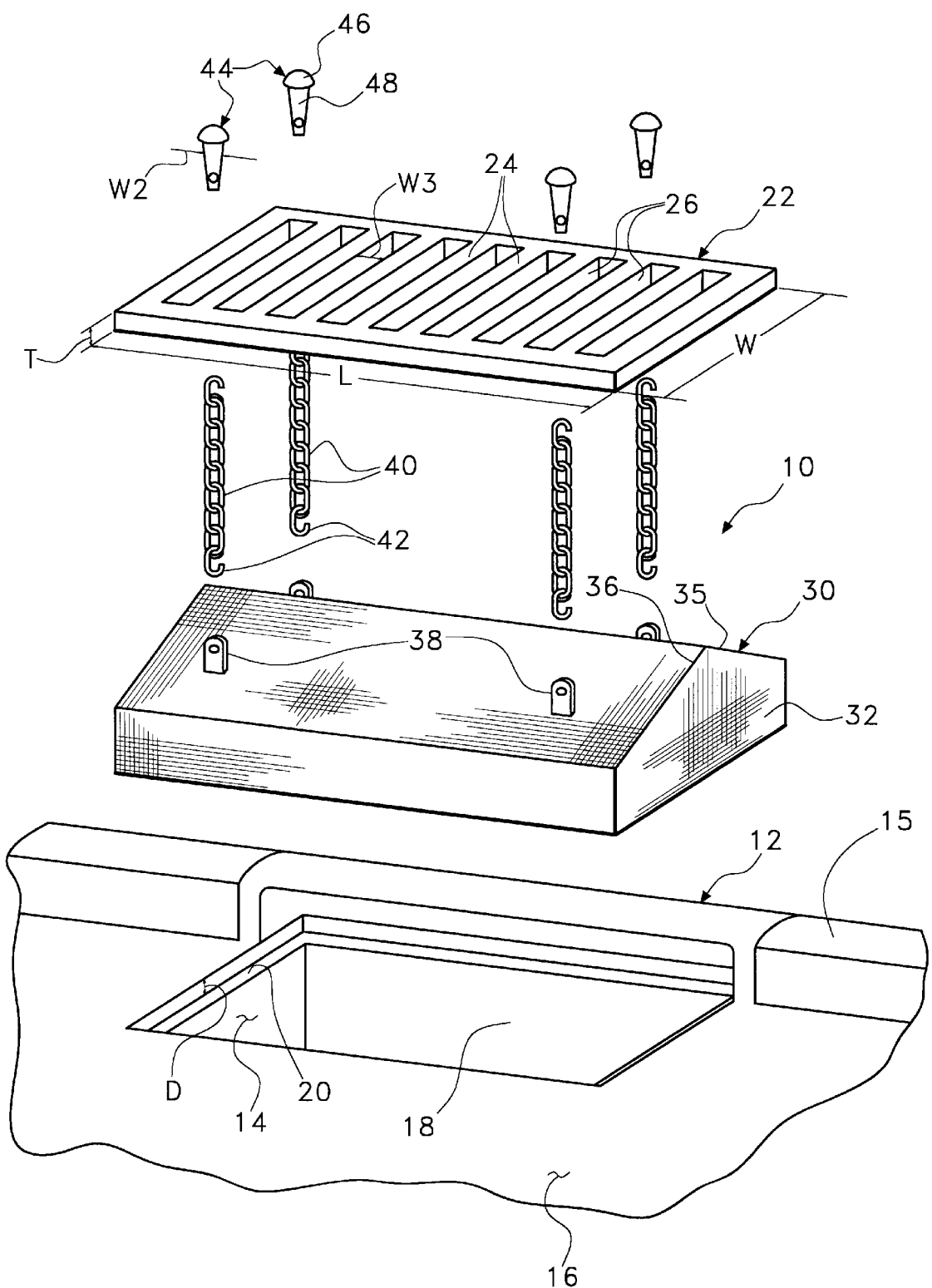
FIG. 1 is an exploded perspective view of an exemplary embodiment of a filter apparatus, in accordance with the present invention, shown in conjunction with a typical prior art storm drain.
Figure 2:
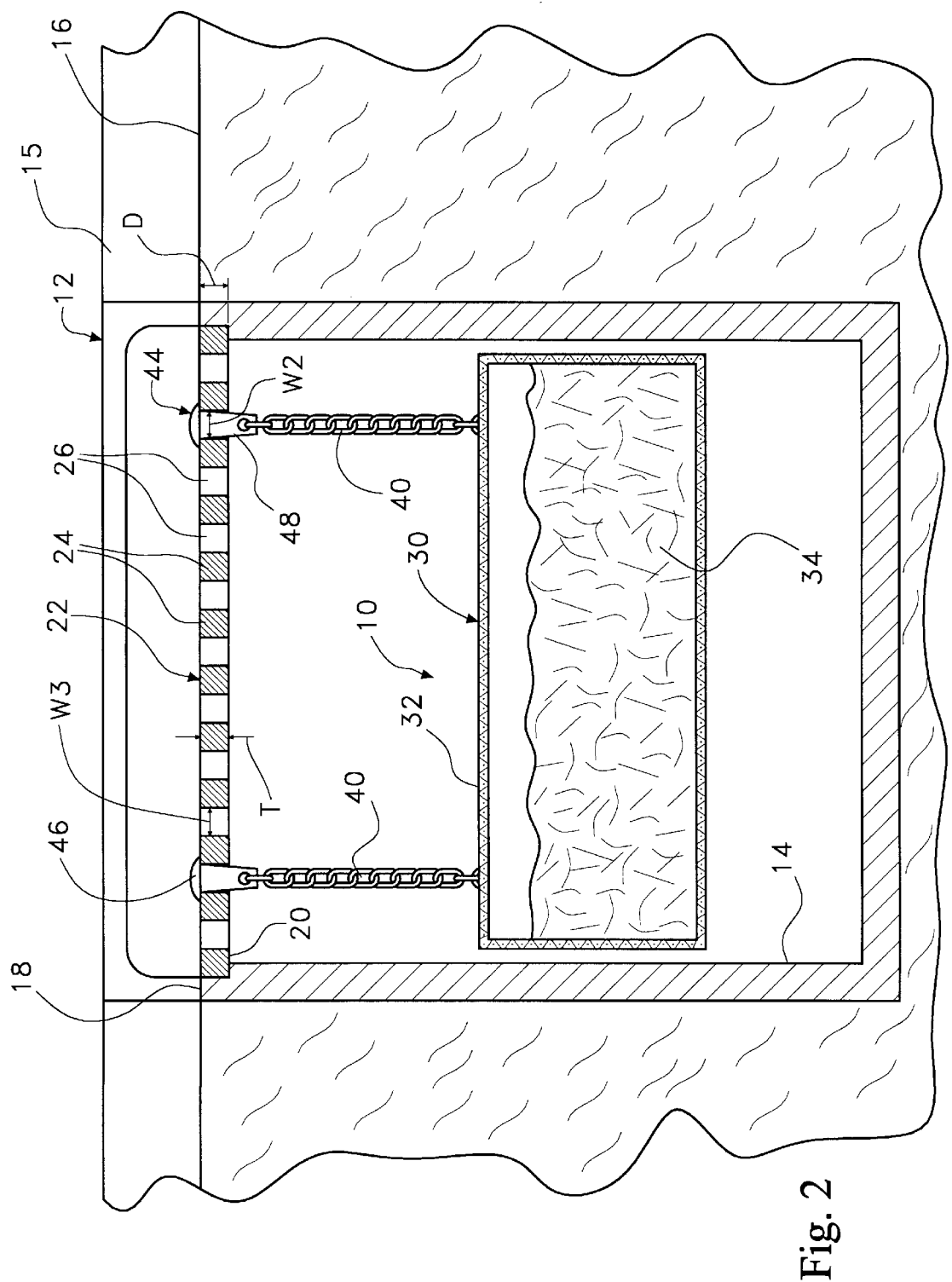
FIG. 2 is a cross-sectional view of the embodiment of the filter apparatus and storm drain shown in FIG. 1, viewed along section line 2—2.

Referring to FIG. 1 in conjunction with FIG. 2, a first exemplary embodiment of the present invention filter apparatus 10 is shown with a common curb side storm drain 12. The storm drain 12 contains a cement catch basin 14 that lays below the plane of a paved street 16 at a point near the curb 15 of the street 16. The catch basin 14 has an open top 18 that terminates at street level. A ridge 20 is formed on the interior of the catch basin 14 a short distance D below the open top 18 of the catch basin 14.

A grate 22 is provided that covers the open top 18 of the catch basin 14. The grate 22 is typically a cast metal structure having numerous parallel slats 24, whereby water is free to flow through the slots 26 that exist in between each of the parallel slats 24. The grate 22 has a length L and a width W (FIG. 1) that enables the grate 22 to pass thorough the open end 18 of the catch basin 14. However, the grate 22 is not large enough to pass the ridge 20 in the catch basin 14. Rather, the peripheral edges of the grate 22 abut against the ridge 20 and evenly support the grate 22 in a horizontal plane. The grate 22 has a thickness T that matches the depth D of the ridge 20 below street level. As a result, when the grate 22 is placed onto the ridge 20 in the catch basin 14, the top surface of the grate 22 is supported at approximately the same level as the street 16.

A replaceable filter cartridge 30 is suspended below the grate 22 within the confines of the catch basin 14. The filter cartridge 30 is comprised of a wire mesh frame 32 that contains a hydrophobic, oil absorbing material 34 (FIG. 2). In the prior art, there exist materials that absorb oil and repel water. An example of such a material is polypropylene fibers. Such polypropylene fibers are commercially sold under the tradename BoniFibers® by BPM, Inc. of New Castle Del.

The top surfaces 35, 36 (FIG. 2) of the wire mesh frame 32 are preferably angled at an acute angle relative the horizontal. The angle of the top surfaces 35, 36 cause large debris to slide off of the filter cartridge 30 and pass into the bottom of the catch basin 14, where such debris is periodically removed during the scheduled maintenance of the storm drain 12. As such, the sloped top surfaces 35, 36 of the wire mesh frame 32 prevent the filter cartridge 30 from being obstructed by collected debris. As runoff water falls through the grate 22 of the storm drain 12, the water passes through the wire mesh frame 32, wherein the water is filtered by the oil absorbing material 34 (FIG. 2) held within the wire mesh frame 32. If the water contains oil or other petroleum based contaminants, those contaminants are absorbed by the filter cartridge 30. However, because the material 34 in the filter cartridge is hydrophobic, the water passes directly through filter cartridge 30 and into the catch basin 14. The water flowing into the sewer from the storm drain 12 therefore contains much less oil contamination than did the runoff water entering the storm drain 12.

Connection brackets 38 (FIG. 1) are disposed on the sloped top surfaces 35, 36 of the filter cartridge 30. The connection brackets 38 are anchored to the wire mesh frame 32 of the filter cartridge 30 in such a manner that the entire weight of the filter cartridge 30 can be supported by the connection brackets 38. Suspension elements, such as chains 40 or rods, are used to suspend the filter cartridge 30 below the grate 22 of the storm drain 12. Chains 40 are described by way of example. The bottom of each of the chains terminates with a hook 42 (FIG. 1) or similar configuration that enables the chains 40 to be mechanically attached to the connection brackets 38 on the top of the filter cartridge 30. The chains 40 attach to the filter cartridge 30 in a removable manner. As such, the filter cartridge 30 can be removed from the chains 40 and replaced periodically.

The top end of each of the chains 40 attaches to an element that engages the grate 22 of the storm drain 12. In the shown embodiment, a wedge element 44 is used to interconnect the chains 40 with the grate 22. The wedge element 44 has a rounded head 46 and a tapered shaft 48 that extends downwardly from the rounded head 46. The tapered shaft 48 has a narrow bottom that expands to a width W2 proximate the rounded head 46. The bottom of the tapered shaft 48 connects to the chains 40 that support the filter cartridge 30. The width W2 of the shaft proximate the rounded head 44 is only slight larger than the width W3 of the slots 26 in between the slats 24 of the grate 22. As a result, when the wedge elements 44 are pushed down into the slots 26 of the grate 22, a slight interference fit occurs that prevents the wedge elements 44 from inadvertently moving.

The bottom of the wedge element's rounded head 46 lays flush on the top surface of the grate 22. The rounded shape of the wedge element's head 46 makes the wedge element 44 hard to engage from above the grate 22. As a result, the head 46 of the wedge element 44 is not a tripping hazard, nor can it be struck and moved by a plow or car tire.

Figure 3:
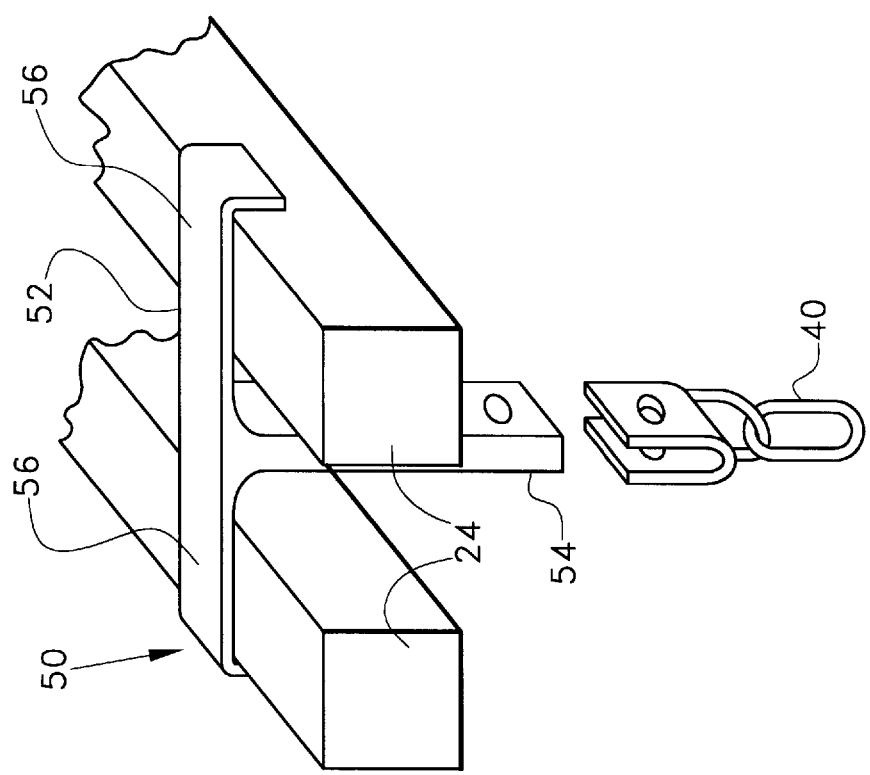
FIG. 3 shows a bracket that can be used to engage a storm drain grate and support the present invention filter apparatus.

Referring to FIG. 3, an alternate embodiment of a grate engagement element 50 is shown. In this embodiment, the engagement element 50 is a T-shaped bracket 52. The stem 54 of the T-shaped bracket 52 passes through one of the slots 26 in the grate 22 and joins to one of the chains 40 that hold the filter cartridge 30 (FIG. 2). The arms 56 of the T-shaped bracket 52 extend over adjacent slats 24 in the grate 22 (FIG. 2) and prevent the T-shaped bracket 53 from falling through the grate. The edges of the T-shaped bracket 52 that extend above the grate are rounded to prevent the T-shaped bracket 52 from being engaged by a plow or tripped over by a passing pedestrian.

Returning to FIG. 1, it can be seen that in order to remove the filter cartridge 30, the grate 22 of the storm drain 12 is engaged and lifted upwardly away from the catch basin 14. Since the filter cartridge 30 is suspended from the structure of the grate 22, the filter cartridge 30 lifts up and out of the catch basin 14 as the grate 22 is removed. Once the grate 22 and filter cartridge 30 are removed, the filter cartridge 30 can be replaced by removing the old filter cartridge from the chains 40 and replacing it with a new clean filter cartridge. The oil soaked old cartridge can then be either sent to a recycling plant for oil extraction of can be disposed of in an environmentally safe manner.

When storms drains are cleaned, the grate of the storm drain must be removed. Maintenance personnel therefore have the equipment needed to remove the grates from storm drains. As such, a maintenance team during the normal maintenance of the storm drain can easily replace old filter cartridges or add a new filter cartridge to a storm drain not previously containing a filter cartridge.

It will be understood that the embodiments of the present invention described and illustrated herein are merely exemplary and a person skilled in the art can make many variations to the embodiment shown without departing from the scope of the present invention. It should also be understood that the various elements from different embodiment can be mixed together to create alternate embodiments that are not specifically described. All such variations, modifications and alternate embodiments are intended to be included within the scope of the present invention as defined by the appended claims.

What is claimed is:

1. In a storm drain that receives liquid and solid waste, having a catch basin and a grate that covers the catch basin, a filter apparatus comprising:

at least one grate engagement element for mechanically engaging the grate;

a suspension element selected from the group consisting of rods and chains coupled to each said grate engagement element, wherein each said suspension element extends downwardly from each said grate engagement element;

a filter cartridge coupled to each said suspension element suspended a predetermined distance below the grate, said filter cartridge having at least one water permeable top surface that is sloped, wherein liquid is free to flow through said at least one water permeable top surface and solid waste larger than a predetermined size is deflected by said at least one water permeable top surface.

2. The apparatus according to claim 1, wherein said filter cartridge contains an oil absorbing material.

3. The apparatus according to claim 1, wherein said filter cartridge contains a mesh frame and a filter element contained within said mesh frame.

4. The apparatus according to claim 1, wherein the grate contains slots through which water flows and each said grate engagement element is configured to engage one of said slots with an interference fit.

5. The apparatus according to claim 1, wherein each said grate engagement element has a first region that extends above the grate and a second region that extends below the grate, and said first region is rounded to reduce vertical surfaces on said first region.

6. The apparatus according to claim 1, wherein the grate contains slots through which water flows and each said grate engagement element is configured to have a head that does not fit through a slot and a shaft that extends below said head and can pass through a slot.

7. A storm drain apparatus, comprising:

a catch basin having an open top;

a removable grate covering said open top of said catch basin, wherein said grates defines a plurality of slats through which water can flow;

a filter cartridge having at least one water permeable top surface that is sloped, wherein water is free to flow through said at least one water permeable top surface and solid waste larger than a predetermined size is deflected away from said filter cartridge by said at least one water permeable top surface;

at least one suspension element selected from the group consisting of rods and chains having a first end and a second end, wherein the first end of each suspension element is coupled to said grate and said second end of each suspension element is coupled to said filter cartridge, thereby suspending said filter cartridge below said grate so that most water flowing through said grate passes through said filter element.

8. The apparatus according to claim 7, wherein said filter cartridge contains an oil absorbing material.

9. The apparatus according to claim 8, wherein said filter cartridge contains a mesh frame and filter material contained within said mesh frame.

10. The apparatus according to claim 8, wherein the first end of each suspension element terminates with an engagement element that engages one of said slots with an interference fit.

11. The apparatus according to claim 8, wherein the first end of each suspension element terminates with an engagement element having a head that does not fit through a slot and a shaft that extends below said head and can pass through a slot.

12. A method for adding a filter assembly to a storm drain having a catch basin covered by a slotted grate, said method including the steps of:

connecting a plurality of suspension elements selected from the group consisting of rods and chains to the grate, wherein said suspension elements extend a predetermined distance below the grate into the catch basin;

attaching a filter cartridge to said plurality of suspension elements, and suspending said filter cartridge below the grate, said filter cartridge having at least one top surface that is sloped, wherein substantially all water entering said storm drain passes through said at least one top surface after flowing through said grates and solid waste larger than a predetermined size is deflected away from said filter cartridge by said at least one top surface.

13. The method according to claim 12, wherein said step of connecting a plurality of suspension elements to the grate includes placing wedge elements in some of the slots in said grate and affixing said suspension elements to said wedge elements.

14. The method according to claim 12, wherein said step of connecting a plurality of suspension elements to the grate includes attaching brackets to said grate and affixing said suspension elements to said brackets.

15. The method according to claim 12, wherein said filter cartridge contains an oil absorbing material.

16. The method according to claim 12, wherein said filter cartridge contains a mesh frame and filter material contained within said mesh frame.

* * * * *